(12) United States Patent
Redding et al.

(10) Patent No.: US 12,470,037 B2
(45) Date of Patent: Nov. 11, 2025

(54) OPTICAL FREQUENCY COMB CONTROL

(71) Applicant: The Government of the United States of America, as represented by the Secretary of the Navy, Arlington, VA (US)

(72) Inventors: Brandon F. Redding, University Park, MD (US); Joseph Brady Murray, Ellicott City, MD (US)

( * ) Notice: Subject to any disclaimer, the term of this patent is extended or adjusted under 35 U.S.C. 154(b) by 819 days.

(21) Appl. No.: 17/807,168

(22) Filed: Jun. 16, 2022

(65) Prior Publication Data

US 2022/0416498 A1   Dec. 29, 2022

Related U.S. Application Data

(60) Provisional application No. 63/215,418, filed on Jun. 26, 2021.

(51) Int. Cl.
| | |
|---|---|
| *H01S 3/00* | (2006.01) |
| *G02F 1/35* | (2006.01) |
| *H01S 3/108* | (2006.01) |
| *H01S 3/1106* | (2023.01) |
| *H01S 3/13* | (2006.01) |

(52) U.S. Cl.
CPC .......... *H01S 3/1305* (2013.01); *G02F 1/353* (2013.01); *H01S 3/1086* (2013.01); *H01S 3/1106* (2013.01)

(58) Field of Classification Search
CPC .... H01S 3/1305; H01S 3/1086; H01S 3/1106; G02F 1/353
See application file for complete search history.

(56) References Cited

U.S. PATENT DOCUMENTS

| | | | |
|---|---|---|---|
| 2015/0043598 A1* | 2/2015 | Kashyap | H01S 3/08013 372/6 |
| 2022/0221583 A1* | 7/2022 | Rolland | G01S 7/4917 |

FOREIGN PATENT DOCUMENTS

CN   11298744 A  *  6/2021  .......... G02F 1/3536

OTHER PUBLICATIONS

Torres-Company et al., "Optical frequency comb technology for ultra-broadband radio-frequency photonics," Laser Photonics Review, vol. 8, Issue 3, 2014, pp. 368-393.
Preußler et al., "Generation of ultra-narrow, stable and tunable millimeter- and terahertz-waves with very low phase noise," Optics Express, 2Volume 21, Issue 20, Oct. 7, 2013, 13 pages.
Al-Taiy et al., "Generation of Highly Stable Millimeter Waves With Low Phase Noise and Narrow Linewidth," IEEE Photonics Technology Letters, vol. 27, Issue 15, Aug. 1, 2015, pp. 1613-1616.

(Continued)

*Primary Examiner* — Mark Hellner

(57) ABSTRACT

Optical frequency combs are used for a wide range of applications, some of which require precise control of the amplitude and phase of individual comb teeth. A technique is provided for tooth-level optical frequency comb control. A frequency comb may include a plurality of comb teeth that are separated from one another by a comb frequency spacing. This technique includes generating a train of control pulses, each of the control pulses being frequency-locked to a corresponding tooth of an optical frequency comb to be controlled. The tooth-level control of the frequency comb is enabled via stimulated Brillouin scattering using the train of control pulses.

20 Claims, 8 Drawing Sheets

(56) References Cited

OTHER PUBLICATIONS

Metcalf et al., "Integrated line-by-line optical pulse shaper for high-fidelity and rapidly reconfigurable RF-filtering," Optics Express, vol. 24, Issue 21, Oct. 17, 2016, pp. 23925-23940.
Subias et al., "All in fiber optical frequency metrology by selective Brillouin amplification of single peak in an optical comb," Optics Express, vol. 17, Issue 8, Apr. 13, 2009, pp. 6753-6758.
Terra, Osama, "A Single Mode From Optical Frequency Comb With Relative Stability of 10-17 Using Stimulated Brillouin Scattering," Journal of Lightwave Technology, vol. 37, Issue 21, Nov. 1, 2019, pp. 5363-5369.
Weiner, A.M., "Femtosecond pulse shaping using spatial light modulators," Review of Scientific Instruments, vol. 71, Issue 5, May 2000, 32 pages.
Cundiff et al., "Optical arbitrary waveform generation," Nature Photonics, vol. 4, 2010, pp. 760-766.
Redding et al., "High-resolution wide-band optical frequency comb control using stimulated Brillouin scattering," Optics Express, vol. 30, Issue 12, Jun. 6, 2022, 10 pages.

\* cited by examiner

300

| Generate a train of control pulses, each of the control pulses being frequency-locked to a corresponding tooth of an optical frequency comb to be controlled, the frequency comb having a plurality of comb teeth that are separated from one another by a comb frequency spacing | 302 |

↓

| Enable tooth-level control of the frequency comb via stimulated Brillouin scattering (SBS) using the train of control pulses | 304 |

FIG. 3

OPTICAL FREQUENCY COMB CONTROL

CROSS-REFERENCE TO RELATED APPLICATIONS

This application is a non-provisional of and claims the benefit of U.S. provisional application No. 63/215,418, filed Jun. 26, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #210328-US2.

STATEMENT REGARDING PRIOR DISCLOSURE BY THE INVENTOR(S)

A prior disclosure was made by one or more of the inventors with other named authors. See "High-resolution wide-band optical frequency comb control using stimulated Brillouin scattering" by Redding et al., Vol. 30, No. 12 Optics Express 22097, Jun. 6, 2022. Those other authors who are not named as inventors of this patent application were working under the direction and/or supervision of at least one of the inventors.

BACKGROUND

Optical frequency combs are used for a wide range of applications including spectroscopy, atomic clocks, and microwave photonics. Some techniques have been developed for generating optical frequency combs with varying repetition rate and bandwidth. However, many applications require the precise control of the amplitude and phase of individual comb teeth. While some degree of comb manipulation is possible during the comb generation process (e.g., the envelope and bandwidth of the comb may be adjusted), to realize the full benefit of optical frequency combs it is beneficial to have arbitrary tooth-level control. For example, tunable radio frequency generation may be achieved by selecting pairs of comb teeth with the desired frequency spacing while radio frequency finite impulse response filters have been demonstrated by manipulating the amplitude and phase of individual comb teeth.

Optical frequency combs have been recognized for their potential to enable the next generation of microwave photonic systems due to their ability to efficiently provide a large number of carrier frequencies with high coherence over a broad bandwidth. Electro-optic frequency combs are particularly attractive for these applications due to their flexible and reconfigurable comb spacing. However, exploiting these combs for applications such as microwave photonics may require a system that may manipulate the amplitude and phase of individual comb teeth—effectively providing customized frequency combs. To date, most attempts to provide tooth-level comb manipulation rely on free-space, dispersive optics and spatial light modulators. While these attempts may demonstrate the potential impact tailored frequency combs can have on microwave photonics applications, the systems are poorly suited for many realistic use cases. Specifically, the spectral resolution of these comb shapers are typically limited to 10 GHz—an order of magnitude worse than required for many microwave photonic applications, which require comb teeth separated by approximately 1 GHz in order to match current analog to digital converter speeds. In addition, these free-space systems have a large size, weight, and power and the spatial light modulators they rely on have limited update rates.

SUMMARY

A method for optical frequency comb control is described. The method includes generating a train of control pulses, each of the control pulses being frequency-locked to a corresponding tooth of an optical frequency comb to be controlled. The frequency comb has a plurality of comb teeth that are separated from one another by a comb frequency spacing. The tooth-level control of the frequency comb is enabled via stimulated Brillouin scattering (SBS) using the train of control pulses.

A system for optical frequency comb control is also described. The system includes a seed laser configured to generate an initial control pulse of a train of control pulses, each of the control pulses being frequency-locked to a corresponding tooth of an optical frequency comb to be controlled, the frequency comb having a plurality of comb teeth that are separated from one another by a comb frequency spacing. The system further includes a stimulated Brillouin scattering gain medium configured to enable tooth-level control of the frequency comb via SBS using the train of control pulses.

Further features and advantages of the invention, as well as the structure and operation of various embodiments are described in detail below with reference to the accompanying drawings.

BRIEF DESCRIPTION OF THE DRAWINGS

FIG. 3 depicts a flowchart of a method for optical frequency comb control, according to an example embodiment.

DETAILED DESCRIPTION

Definitions

Figure 1:
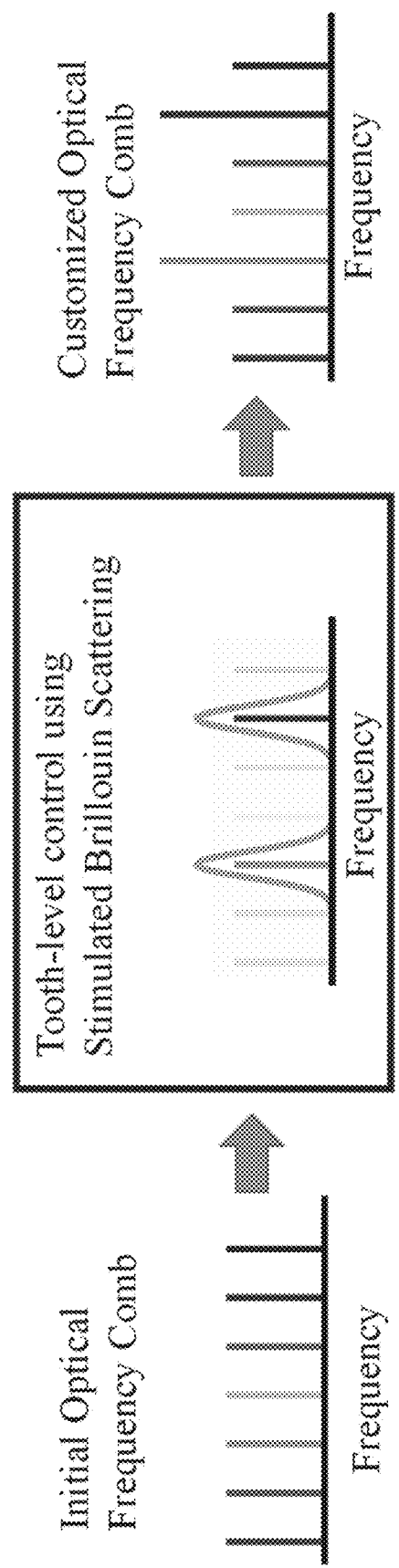
FIG. 1 depicts the concept of tooth-level control of an optical frequency comb.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

A technique for providing tooth-level optical frequency comb manipulation that overcomes the limitations of current approaches is described herein. This technique relies on stimulated Brillouin scattering to modulate the amplitude and/or phase of the individual comb teeth and a frequency-shifted pulse train technology to generate a series of control pulses capable of controlling each individual comb tooth. Together, this enables a scalable platform capable of manipulating large numbers of closely spaced comb teeth and may be implemented using fiber coupled, commercial-off-the-shelf components. In addition, this technique is compatible with other approaches, such as polarization pulling assisted SBS, to improve certain parameters (e.g., modulation depth) when desired.

The technique described herein has several advantages compared with existing frequency comb control schemes. First, the narrow band SBS process enables this technique to manipulate comb teeth with small spacing (e.g., as little as 100 MHz). Second, since the control pulses and the frequency comb may be generated from the same laser, the complex frequency locking schemes used in previous SBS-based approaches are no longer required, or at most, required locking a single laser rather than multiple. Third, this technique enables hundreds of comb teeth to be manipulated with a simple configuration (e.g., three modulators, one to carve the initial control pulse, one for modulating the frequency in a recirculating fiber-optic loop, and one modulator to fine-tune the amplitude of each control pulse). Finally, the SBS based signal processing may be performed in a single optical fiber, introducing negligible loss. Further, this common-path technique also minimizes the phase variation between comb teeth, which may be a major challenge in existing comb shapers that spatially separate each comb tooth and are sensitive to environmental fluctuations in the optical paths travelled by different comb teeth.

Optical frequency combs are a light source comprised of a number of optical frequencies with a fixed frequency spacing. There are many mechanisms to generate optical frequency combs. For example, a mode-locked laser may be used to generate a frequency comb by producing a series of very brief, closely spaced pulses of light containing many different colors. Due to the mode locking technique, all of the frequencies in each pulse start in phase, in sync with each other, resulting in each frequency being separated into a distinct spike like a tooth of a comb. The frequency domain representation of an ideal frequency comb is a series of delta functions that are evenly spaced according to the comb tooth spacing (i.e., the repetition rate of the mode-locked laser or alternatively modulation frequency) and a carrier offset frequency. Thus, optical frequency combs may be used to measure light emitted by atoms, stars, etc., with high precision and accuracy.

Optical frequency combs are a powerful tool and have been used for spectroscopy, ranging, optical communications, and metrology. These diverse applications require combs with varying bandwidth, repetition rate, and operating wavelength. In addition, many applications require the ability to customize the shape of the comb or manipulate the comb on a line-by-line or tooth-by-tooth basis. Complex control of each comb tooth—sometimes called optical arbitrary waveform generation—opens up additional applications in the areas of microwave photonics, optical communication, microscopy and non-linear spectroscopy.

Fourier pulse shaping is a conventional approach to manipulate a frequency comb. In this scheme, the comb is spectrally dispersed so that each comb tooth can be manipulated separately (e.g., using a spatial light modulator) before being recombined. Fourier pulse shapers based on free space optics are available and have broadened the application space for optical frequency combs. However, these systems provide limited spectral resolution (typically greater than 10 GHz) and a slow update rate (typically less than 100 Hz), which are significant limitations for many radio frequency (RF) photonic applications. Faster update rates may be achieved using integrated photonics based Fourier pulse shapers that combine arrayed waveguide gratings (AWGs) with on-chip modulators. However, the resolution of AWGs is typically also greater than 10 GHz, while cross-talk and fabrication tolerances limit the number of comb teeth that can be manipulated using this approach. Higher spectral resolution is required to manipulate individual teeth in combs generated by fiber lasers, which typically exhibit a repetition rate on the order of 100 MHz. In addition, high spectral resolution enables longer waveforms, which are of interest for microwave photonics applications. There are also conventional broadband RF generation approaches that select a pair of comb teeth separated by the desired RF carrier frequency using SBS. These approaches rely on a bank of control lasers and complex feedback loops to lock the frequency of each laser to an individual comb tooth, resulting in a cumbersome system with poor scalability, limited reconfiguration, and slow update rate. In addition, manipulation of the comb is limited to selecting one or two comb teeth at a time while rejecting the rest of the comb. Thus, the entire frequency comb is not manipulated with the current SBS-based approaches.

Described herein is a technique that uses non-linear optical signal processing based on SBS to amplify, attenuate, and/or modulate the amplitude and/or phase of the individual comb teeth of an optical frequency comb, for example, as shown in FIG. 1, which depicts the concept of tooth-level control of an optical frequency comb. In FIG. 1, an initial optical frequency comb, shown in FIG. 1 as having seven evenly spaced teeth, may be controlled on a tooth-by-tooth basis using SBS. More specifically, teeth number 3 and 6 are controlled or manipulated, resulting in a customized optical frequency comb with teeth 3 and 6 amplified while the other teeth remain unaffected. The SBS process is inherently narrowband, allowing a control laser to address individual frequency comb teeth separated by as little as 100 MHz, 2 orders of magnitude improvement compared with the current state-of-the-art frequency comb shapers.

In an embodiment, this technique may be implemented using fiber-coupled commercial off-the-shelf (COTS) components and may be packaged into a low size, weight, and power, scalable, robust system with low insertion loss. In addition, this system enables a single high-speed modulator to manipulate each comb tooth—enabling the type of rapidly reconfigurable optical frequency combs required for state-of-the-art microwave photonics applications. In an embodiment, such system may utilize a single seed laser to provide tooth-level control of an entire frequency comb. The technique described herein enables the combination of nonlinear optical control using SBS with a technique for creating a train of frequency-shifted pulses, each of which is synchronized with a comb tooth. In an embodiment, a train of control pulses may be generated from the same seed laser used to produce the optical frequency comb, ensuring that each control pulse remains frequency locked to its corresponding comb tooth without requiring active feedback.

Example Embodiments

In embodiments, the optical frequency comb control technique described herein relies on two frequency shifting loops with matched frequency shifting modulators. The first frequency shifting loop may be seeded with a continuous wave (CW) light to create a standard optical frequency comb while the second frequency shifting loop may be injected with pulsed light to generate a train of control pulses. These control pulses may be used to selectively amplify individual comb teeth using the SBS process. Since these control pulses are temporally separated, a modulator may be used to adjust the amplitude of each control pulse and thereby control the amplification experienced by each comb tooth. This effectively converts the challenging problem of addressing comb teeth that are closely spaced in the frequency domain to the much easier task of modulating a train of control pulses that are separated in the time domain.

Figure 2:
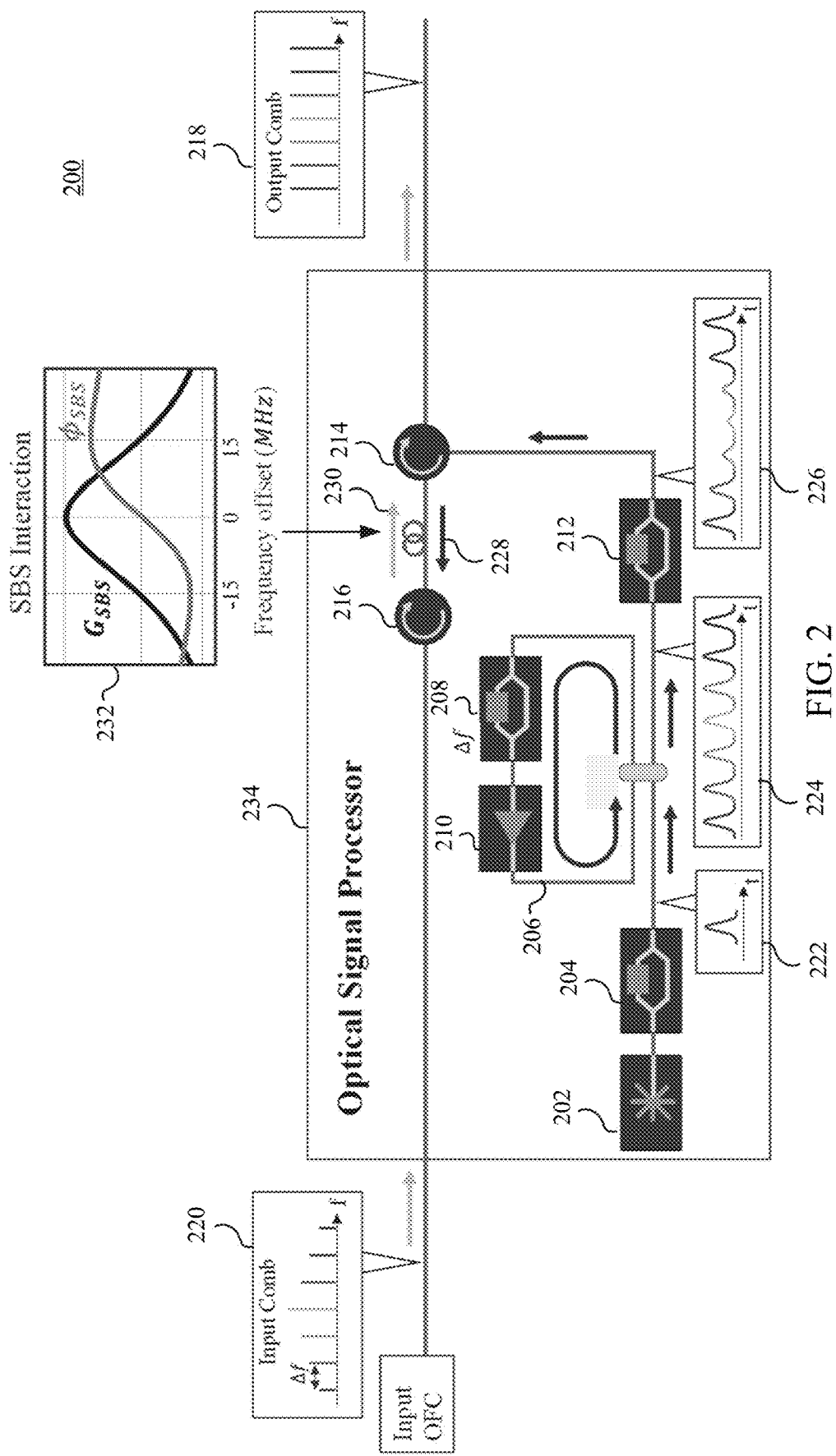
FIG. 2 is schematic of a system for optical frequency comb control, according to an example embodiment.

FIG. 2 is a schematic of a system for optical frequency comb control, according to an example embodiment. System 200, shown in FIG. 2, is configured to generate a train of frequency-shifted pulses, the pulses being frequency-synchronized with the comb teeth of an optical frequency comb 220. In an embodiment, system 200 may include as an optical signal processor 234 with a recirculating fiber-optic loop that includes a modulator and an amplifier to compensate for loss. System 200 is configured to control or manipulate (e.g., amplify, attenuate, phase shift, rotate a polarization) comb 220 on a tooth-by-tooth basis to generate an output optical frequency comb 218.

The optical frequency comb control process may be implemented in various ways. For example, FIG. 3 depicts a flowchart of a method for optical frequency comb control, according to an example embodiment. Flowchart 300 is described in reference to system 200, shown in FIG. 2, although other systems described herein may be utilized to implement the process of flowchart 300. Note that the steps of flowchart 30 may be performed in an order different than shown in FIG. 3, and not all steps of flowchart 300 need to be performed in all embodiments.

Flowchart 300 begins with step 302. In step 302, a train of control pulses are generated. Each of the control pulses being frequency-locked to a corresponding tooth of an optical frequency comb to be controlled, the frequency comb having a plurality of comb teeth that are separated from one another by a comb frequency spacing. Generating the train of control pulses includes generating an initial control pulse; shifting a frequency of the initial control pulse by a predetermined frequency to generate a first control pulse after the initial control pulse is coupled into a recirculating fiber loop or frequency shifting loop; amplifying the first control pulse to compensate for loss; and repeating the shifting and amplifying steps to generate the train of control pulses. The amplitude and/or frequency of each control pulse of the train of control pulses may be modulated or fine tuned to create a pattern that is configured to be imparted onto the frequency comb using a modulator.

For example, as shown in FIG. 2, an initial pulse 222 may be modulated from a continuous wave (CW) seed laser 202 to generate a pulse train 224 of control pulses using an electro-optic modulator (EOM) 204. In an example embodiment, seed laser 202 may also be used to generate the optical frequency comb 220, thereby locking the frequency of control pulses of train 224 to optical frequency comb 220, although this is not strictly required. Initial pulse 202 may be coupled into a recirculating fiber loop 206 containing a frequency shifting element 208 (e.g., a single-sideband modulator (SSBM)) and an amplifier 210 (e.g., erbium doped fiber amplifier (EDFA)). With each round trip in loop 206, initial pulse 222 is frequency shifted by a predetermined amount, $\Delta f$, by frequency shifting element 208, amplified to compensate for loss, and a fraction (e.g., 10-90%) of the pulse energy may be extracted from the loop. This creates train 224 of control pulses at the output of loop 206 with progressively higher frequency such that the $n^{th}$ pulse in the sequence is shifted from the initial laser frequency by $n \cdot \Delta f$. By matching this frequency shift to the comb frequency spacing, each of the control pulses of train 224 may be frequency locked to each comb tooth of the optical frequency comb 220.

The generation of train 224 may be alternatively accomplished using multiple, potentially cascaded stages. For instance, a first stage may create an initial train with N pulses separated by $\Delta f$, while a second stage may replicate this initial train to create a series of pulse trains separated by N $\Delta f$. Similarly, a single stage may be reused. In this case, after N pulses have been created, the circulating pulse may be blocked and the newly created pulse train may be coupled back to the input of the frequency shifting loop (e.g., loop 206) and the frequency shifting element may be switched to shift at the frequency of N $\Delta f$. As another example, the pulse train may be generated in parallel by replicating the frequency shifting loop to create a series of shorter pulse trains that may then be recombined. All of these schemes may reduce the maximum number of round trips required to produce a pulse train with a given length, potentially reducing the noise introduced by amplification or frequency shifting in the loop.

Referring to FIG. 3, in step 304, tooth-level control of the frequency comb is enabled via stimulated Brillouin scattering using the train of control pulses. For example, optical frequency comb 220 may be controlled at the tooth-level via SBS using train 224. In an embodiment, an additional modulator 212 inserted after loop 206 may be used to fine-tune the amplitude and frequency of each of the control pulses of train 224 to generate train 226. In operation, train 226 may be coupled into an SBS gain medium (e.g., a standard optical fiber) using a pair of directional couplers 214 and 216 so that train 226 propagates in a first direction 228 that is opposite of a second direction 230 of optical frequency comb 220. One or more comb teeth of optical frequency comb 220 may then be selectively amplified, attenuated, phase shifted, polarization rotated to leverage a polarization pulling effect configured to improve extinction, thereby increasing modulation depth, by control pulses of train 226 using the SBS process. Thus, as seen in FIG. 2, the pattern of train 226 is imparted onto optical frequency comb 220 to generate output optical frequency comb 218.

Brillouin scattering is a light scattering effect caused by the non-linearity of a medium, specifically the delayed non-linear response related to acoustic phonons. Stimulated Brillouin scattering (e.g., the SBS process shown in plot 232) can be particularly efficient in optical fiber due to the potential for long interaction lengths and the small mode volume. In optical fiber, SBS is typically observed by introducing counter-propagating beams that are separated by the Brillouin frequency of the fiber (~10 GHz). If the "pump" beam (e.g., the control pulses 226) has higher frequency than the "probe" beam (e.g. the optical frequency comb 220), the probe beam will experience Brillouin amplification through the Stokes scattering process. If the pump beam has a lower frequency than the probe beam, the probe will be attenuated via the anti-Stokes process. In addition to amplification and attenuation, the SBS process can introduce a phase shift in the probe beam if the pump and probe frequency separation is slightly de-tuned from the Brillouin frequency of the fiber (see the SBS process depicted in plot 232). Thus, the SBS process enables all-optical control of the amplitude and phase of a probe beam.

Brillouin scattering occurs in a limited bandwidth, as shown in plot 232, 30 MHz for standard optical fiber at room temperature. Thus, the narrowband interaction enables independent control of closely spaced comb teeth. For example, if one tooth is separated from another tooth by 50 MHz or more, then there will be negligible interference between the two teeth and their respective control pulses, and thus a resolution of approximately 100 MHz may be achieved. While spacing of less than 50 MHz may be possible, there may be more cross-talk.

Referring back to FIG. 2, while the frequency separation of train 224 or train 226 may be the same as the frequency spacing of optical frequency comb 220, the pulse train should have an overall frequency offset that matches the SBS frequency of the gain medium. That is, each control pulse should be shifted by the Brillouin frequency, $f_{SBS}$, away from the comb tooth it is designed to modulate. If the control pulse frequency is $f_{SBS}$ higher than the comb tooth frequency, it may amplify the comb tooth via the Brillouin Stokes process. If the control pulse frequency is $f_{SBS}$ below the comb tooth frequency, it may attenuate the comb tooth via the Brillouin anti-Stokes process. This frequency offset maybe accomplished by tuning the seed laser or shifting the frequency of train 224 using a modulator. To ensure the optical frequency comb interacts with at least one control pulse, the total period of pulse train 224 may be matched to the time of flight in the gain medium divided by some integer. This may allow each comb tooth to interact with multiple pulse trains, potentially reducing variations at the pulse train repetition rate or enabling higher SBS gain.

As shown in FIG. 2, system 200 may be implemented with various components coupled with optical fiber and may provide high resolution (e.g., approximately 100 MHz), a fast update rate (e.g., greater than 100 kHz), with low size, weight and power requirements. In an example embodiment, system 200 may be implemented entirely on a photonic integrated chip (PIC) using integrated components, such as modulators, waveguides, and amplifiers. This embodiment may further reduce the system size, weight, and power requirements.

In the example embodiment shown in FIG. 2, system 200 may include a separate generator that generates the optical frequency comb with a frequency locking approach. For example, two lasers may be used—one laser to generate the optical frequency comb and the other laser to generate the control pulses for the optical frequency comb with a frequency locking scheme (e.g., Pound-Drever-Hall technique). Alternatively, system 200 may include a single laser for generating both the optical frequency comb and the pulse train for controlling that optical frequency comb.

Figure 4:
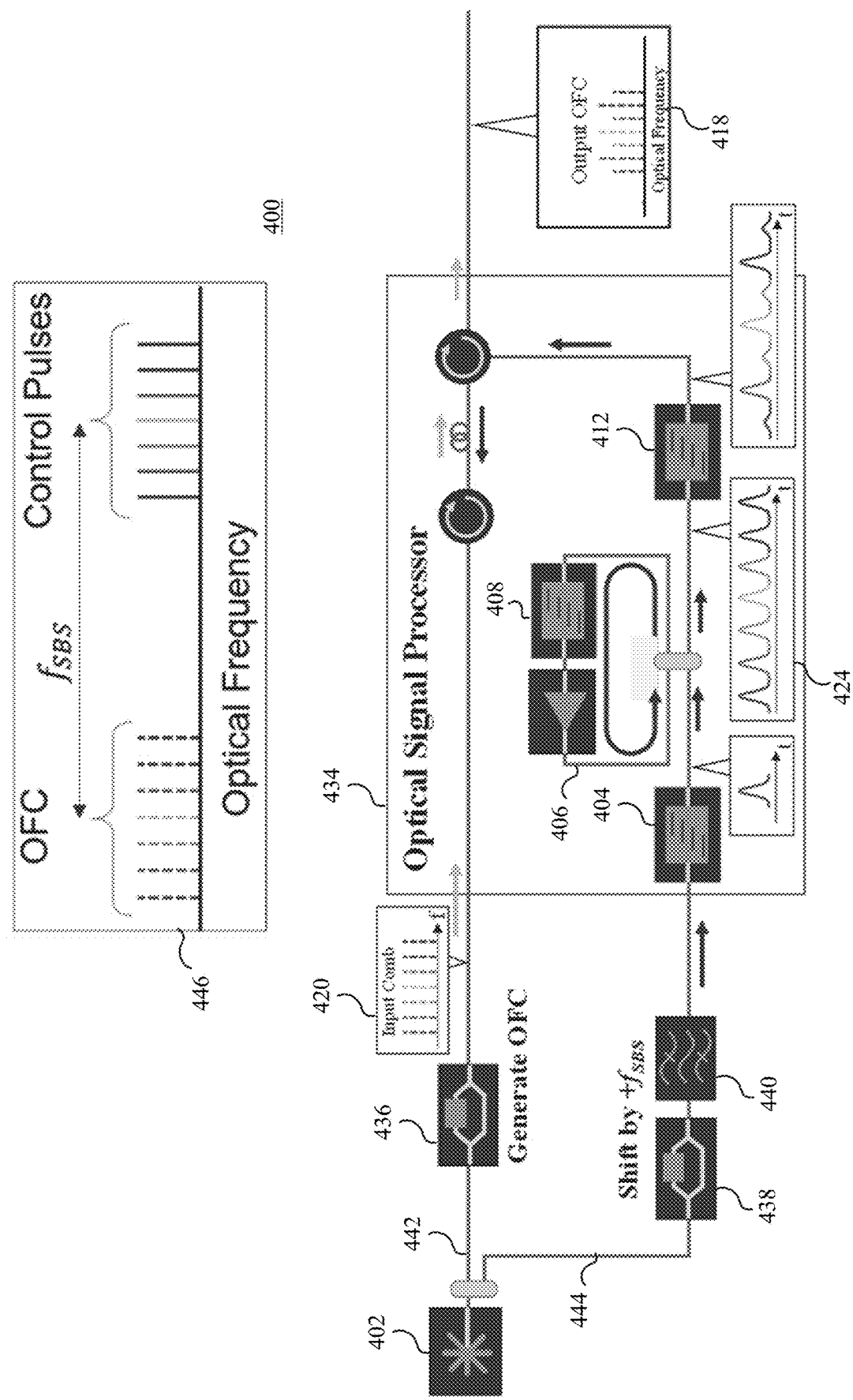
FIG. 4 depicts a system for optical frequency comb control, according to another example embodiment.

FIG. 4 depicts a system for optical frequency comb control, according to another example embodiment. System 400, shown in FIG. 4, includes one seed laser 402 (e.g., narrow-band) configured to generate input optical frequency comb 420 and seed optical signal processor 434. System 400 is otherwise similar to system 200. In system 400, laser 402 is configured to generate a light beam with a first portion that is directed along comb path 442 to an electro-optic modulator (EOM) 436 that is configured to generate a comb 420 with seven comb teeth separated by a spacing of 55 MHz. A second portion of the light beam is directed along a control path 444 to be coupled to optical signal processor 434, second portion may be first shifted by the SBS frequency (e.g., 10 GHz for standard optical fiber) by modulator (EOM) 438. Because the same seed laser is used in system 400, the initial control pulse needs to be shifted by $f_{SBS}$ from the initial comb tooth. Modulator 438 may be placed elsewhere, for example, along comb path 442. A tunable filter 440 is configured to select either the upper or lower sideband in order to amplify the comb teeth (via the Brillouin Stokes interaction) or attenuate the comb teeth (via the Brillouin anti-Stokes interaction). A train 424 of control pulses may be generated as described above in reference to FIG. 2, using three acousto-optic modulators (AOMs) 404, 408 and 412 to carve the control pulses and introduce a 55 MHz frequency shift in loop 406 (matched to the 55 MHz comb tooth spacing). Frequency diagram 446 shown in FIG. 4 shows the relative optical frequencies of input comb 420 and control pulses 424. Each control pulse is shifted by $f_{SBS}$ relative to its corresponding comb tooth with the spacing between the comb teeth and the spacing between the control pulses being the same.

Figure 5:
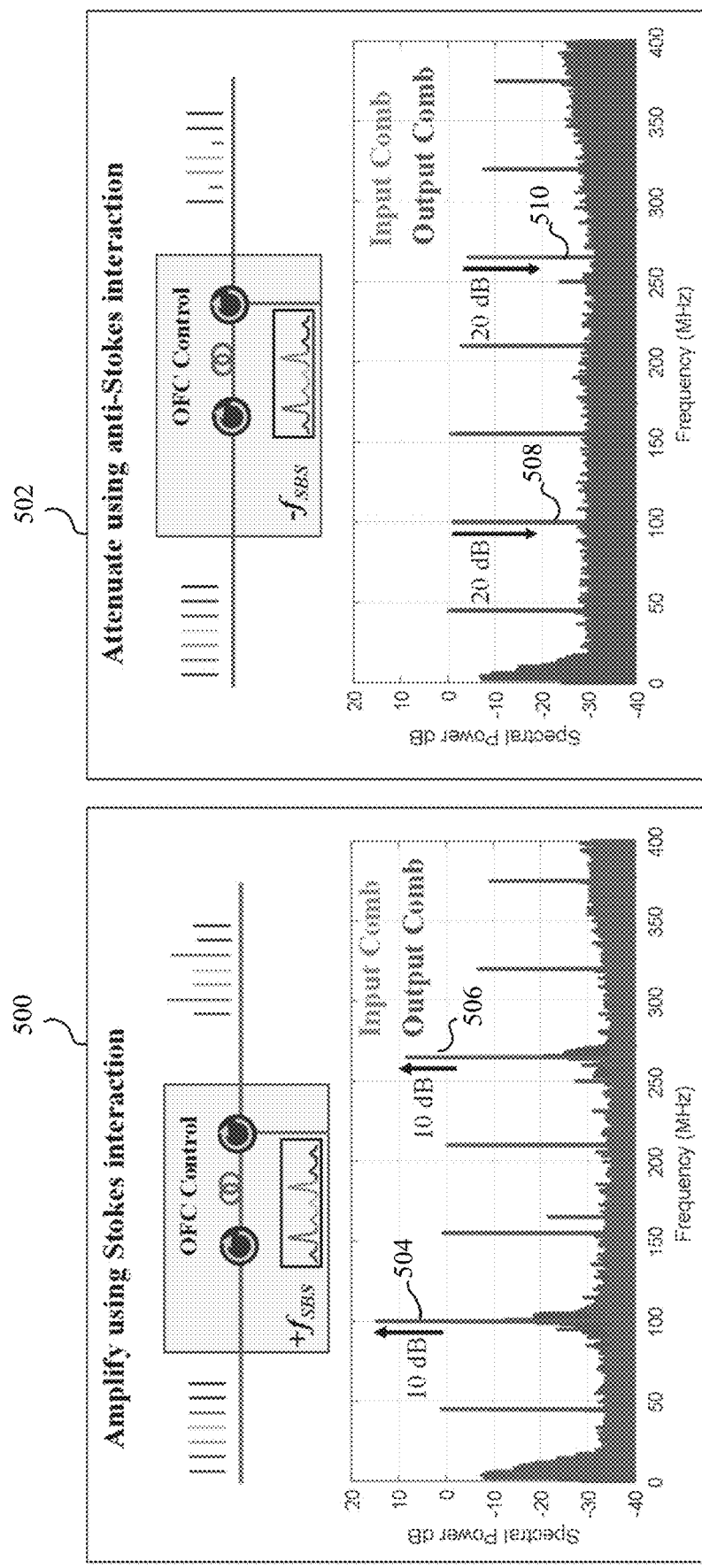
FIG. 5 depicts plots illustrating amplitude control of an optical frequency comb.

With system 400, shown in FIG. 4, it is possible to modulate any combination of comb teeth by adjusting the transmission through AOM 412 to generate output comb 418. In FIG. 5 depicts plots illustrating amplitude control of an optical frequency comb (e.g., comb 420 shown in FIG. 4), including plot 500 for amplification and plot 502 for attenuation of individual comb teeth. In both plots 500 and 502, the original input comb is depicted in light gray and the modulated output comb is depicted in dark gray. In plot 500, second comb tooth 504 and fifth comb tooth 508 are shown as being selectively amplified by 10 dB each via Stokes interaction. Thus, for comb tooth 508 at frequency $f_2$, the corresponding control pulse has a frequency of $f_2+f_{SBS}$ and for comb tooth 510 at frequency $f_5$, the corresponding control pulse has a frequency of $f_5+f_{SBS}$. In plot 502, second comb tooth 508 and fifth comb tooth 510 are shown as being selectively attenuated by 20 dB each via Stokes interaction. Thus, for comb tooth 508 at frequency $f_2$, the corresponding control pulse has a frequency of $f_2-f_{SBS}$, and for comb tooth 510 at frequency $f_5$, the corresponding control pulse has a frequency of $f_5-f_{SBS}$. As shown in these plots, it is possible to modulate comb teeth separated as little as 55 MHz with minimal cross-talk and with a modulation depth of approximately 30 decibels (10 dB of amplification and 20 dB of attenuation). An increase in the modulation depth may be possible with trade-offs, for example, at a reduced update rate or a reduced number of comb teeth that are manipulated.

Figure 6:
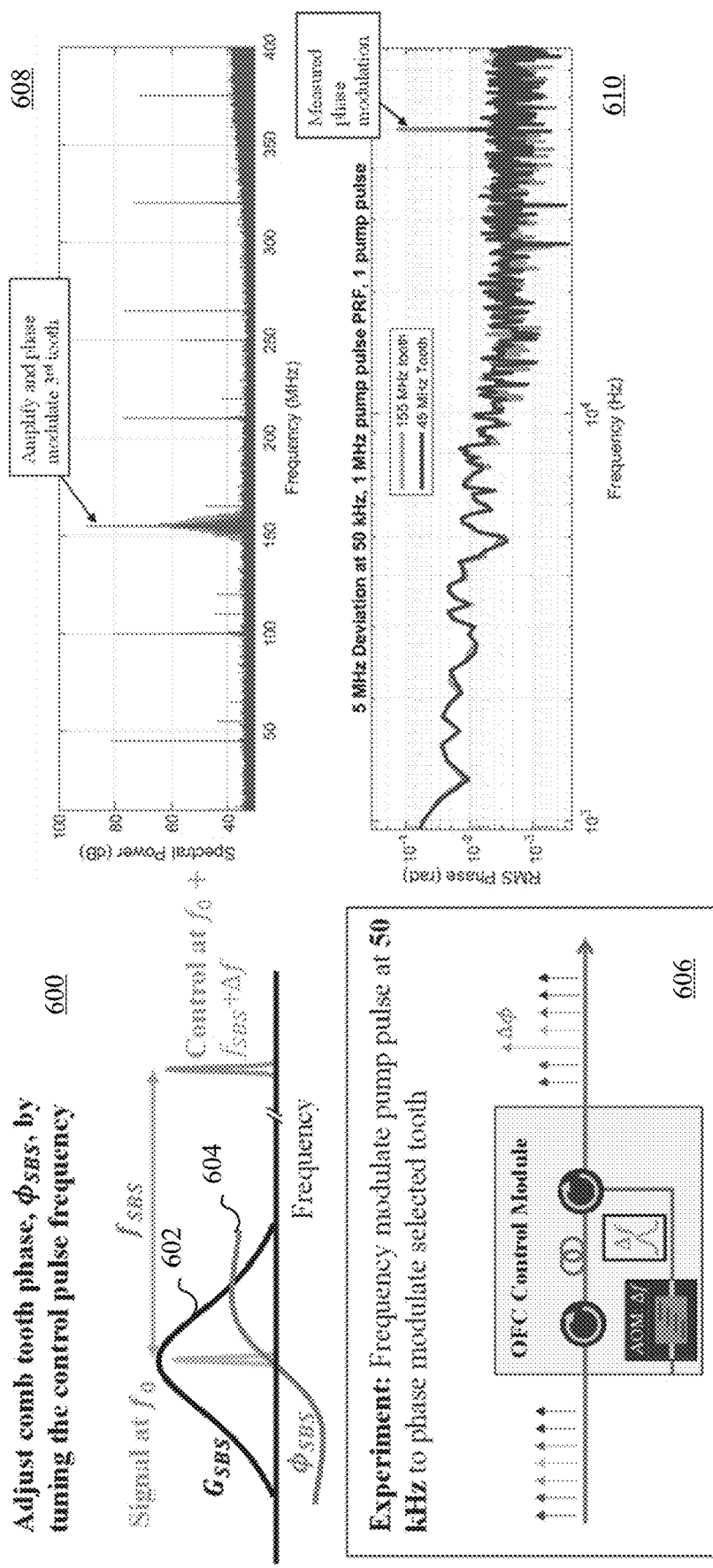
FIG. 6 depicts plots illustrating phase control of an optical frequency comb.

FIG. 6 depicts plots illustrating phase control of an optical frequency comb. Besides amplification and attenuation, the phase of an individual comb teeth may also be manipulated or shifted. In plot 600, the Brillouin gain spectrum is shown as a solid black line 602, and the phase shift associated with it is shown as a gray line 604. The control pulse may be moved left or right on plot 600 to change the gain as well as the phase. For a particular individual comb tooth at $f_0$, the control pulse frequency may be set at $f_0+f_{SBS}+\Delta f$. Thus, moving the control pulse to the left on plot 600 would result in a positive phase shift, and moving it to the right would result in a negative phase shift. In an experiment depicted in diagram 606, a frequency modulated pump pulse at 50 kHz is provided to phase modulate a selected tooth, resulting in a phase change for a third comb tooth of a comb with seven teeth. The results are shown in plots 608 and 610. In plot 608, the third comb tooth is shown as being amplified compared to the remaining teeth. In plot 610, the third comb tooth (at 155 MHz) is shown with a 5 MHz deviation at 50 kHz compared to the first comb tooth (at 45 MHz). The ability to be able to manipulate the phase in addition to the amplitude adds robustness to the control scheme, even though it may not be needed in some applications.

Figure 7:
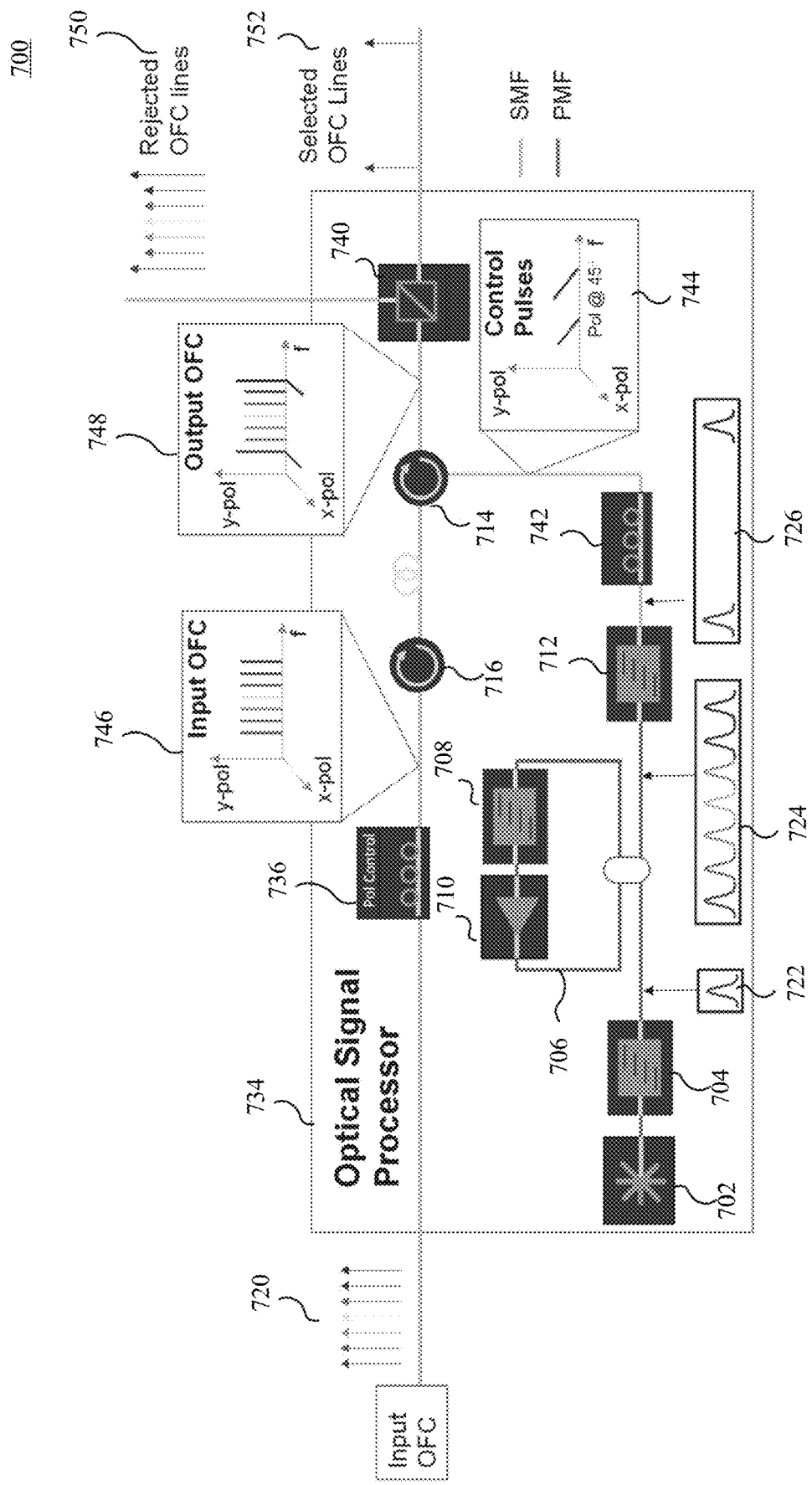
FIG. 7 depicts a system for optical frequency comb control that leverages polarization pulling assisted stimulated Brillouin scattering, according to yet another example embodiment.

There are other ways to enhance optical frequency comb control technique described herein, for example, leveraging other schemes such as polarization pulling assisted SBS and/or components (e.g., using polarization maintaining fiber instead of standard optical fiber) to manipulate optical frequency combs. FIG. 7 depicts a system for optical frequency comb control that leverages polarization pulling assisted SBS, according to yet another example embodiment. System 700, shown in FIG. 7, includes components that are similar to those shown in FIGS. 2 and 4, and those components are not described again here for brevity purposes. System 700 is different from the systems shown in FIGS. 2 and 4 in that system 700 implements a polarization pulling assisted SBS process to increase modulation depth.

To manipulate an optical frequency comb, a polarization pulling assisted SBS technique may be used. If the pump and probe beams have different (but not completely orthogonal) polarization states, the polarization state of the amplified probe signal may be "pulled" toward the polarization state of the pump. This technique enables large modulation depth with modest Brillouin gain (generally limited by the polarization extinction ratio) by using this SBS-induced change in polarization to separate the amplified comb teeth from the remaining comb teeth.

System 700 may include an optical signal processor 734, a laser 702, a modulator 704, a modulator 708, an amplifier 710, a modulator 712, a pair of circulators 714 and 716, a first polarization controller 736, and a second polarization controller 742, and a polarizing beamsplitter (PBS) 740. In an example embodiment, the components of optical signal processor 734 may be coupled together using single mode fiber (SMF), shown in FIG. 7 as light gray, and polarization maintaining fiber (PMF), shown in FIG. 7 as dark gray. PMF may generally be used to connect the components between laser 702 and modulator 712, including modulator 704, modulator 708, amplifier 710. System 700 may include more or fewer components than shown in FIG. 7.

In operation, an optical frequency comb 720 may be generated and provided to optical signal processor 734. Laser 702 and modulator 704 may be used to generate and modulate an initial pulse 722, which may be frequency shifted in loop 706 to form a train 724 of control pulses that are frequency locked to comb 720. Comb 720 and initial pulse 722 may be generated by laser 702 or they may be generated by different lasers. Comb 720 may be coupled through a polarization controller 736 and then directed through a spool of fiber using circulators 714 and 716 before reaching polarizing beamsplitter (PBS) 740. Polarization controller 736 may set the polarization of comb 720 to generate comb 746 with all the comb teeth in one polarization (e.g., y-polarization) such that transmission through PBS 740 may be minimized in the absence of Brillouin amplification.

Modulator 712 may modulate the amplitude and frequency of the control pulses of train 724 to generate modulated train 726. Polarization controller 742 may rotate the polarization of train 726, for example, as shown in plot 744, depicting the first and last control pulses in the y-polarization being rotated by 45 degrees. Then, the control pulses may be coupled into the spool of fiber traveling in the opposite direction from comb 746 to generate an output comb 748. PBS 740 is configured to transmit the teeth in one polarization as shown in diagram 752 with a final output comb with selected comb teeth (first and last, x-polarization) that have been amplified by the SBS process, and to reject the teeth (y-polarization) as shown in diagram 750. This scheme thus allows a high modulation depth as the result of the extinction provided by PBS 740 in addition to the SBS gain.

In an example embodiment, system 700 may be implemented with one laser that generates both an optical frequency comb using a first frequency shifting loop and a train of control pulses using a second frequency shifting loop. The first frequency shifting loop may include a first acoustic-optic modulator $AOM_1$, a first tunable bandpass filter, and a first erbium-doped fiber amplifier, $EDFA_1$. The second frequency shifting loop may include components for generating the first initial control pulse, including an EOM, a second tunable filter, and a second $AOM_2$; components for generating the pulse train, including a third $AOM_3$, a third filter, and a second $EDFA_2$; components for modulating the pulse train, including a fourth $AOM_4$, and a third $EDFA_3$. The comb selection via SBS polarization pulling may be implemented with a polarization controller and a couple of circulators.

In operation, a single, narrowband laser (kHz linewidth) may be used to seed both frequency shifting loops, ensuring that their outputs are frequency locked. CW light may be coupled into the first frequency shifting loop through a 50:50 splitter to generate an initial optical frequency comb. $AOM_1$ may impart a frequency shift (e.g., 200 MHz) while the $EDFA_1$ gain may be adjusted to compensate for loss. The first bandpass filter (e.g., set to 10 GHz), dictates the bandwidth of the comb and suppresses amplified spontaneous emission. The output of this first frequency shifting loop is a 10 GHz wide initial comb 720 with teeth spaced by f=200 MHz.

The second frequency shifting loop may be used to generate a train of frequency shifted control pulses. The system may be designed so that each control pulse is shifted by the Brillouin frequency (of optical fiber) relative to its corresponding comb tooth. Each control pulse may be shifted by the Brillouin frequency of the gain medium (e.g., optical fiber) relative to its corresponding tooth. The EOM driven at the Brillouin frequency (~10.8 GHz) with a peak-to-peak voltage of ~$V_\pi$ in the suppressed carrier mode to produce a pair of sidebands. The second filter may be used to select the upper sideband. The second $AOM_2$ may be used to carve an initial pulse with a duration $\tau_{control}$ at a repetition period $T_{control}$. This pulse may be coupled into the second frequency shifting loop via the 50:50 coupler. As in the first frequency shifting loop, the third $AOM_3$ may be driven at 200 MHz. The same RF signal generator may be used to drive both first $AOM_1$ and second $AOM_2$, ensuring that the control pulses are frequency locked with the comb teeth. In the second frequency shifting loop, an RF switch may be used to modulate the electronic RF drive applied to the third $AOM_3$ 708 into a series of N pulses with a duration $\tau_{control}$ at a repetition period of $\tau_{loop}$, corresponding to the round-trip time in the second frequency shifting loop. This allows control of the number of pulses generated in the loop. A 100 GHz wavelength division multiplexing (WDM) filter may be used to suppress amplified spontaneous emission. In this embodiment, N=50 pulses may be generated with a pulse duration of $\tau_{control}$=2 µs ($T_{loop}$~2.07 µs). Thus, the total pulse train has a duration of $T_{control}$=N·$T_{loop}$=103.5 µs. Since the control pulses are temporally separated, a fourth $AOM_4$ may be used to selectively modulate the amplitude of each control pulse. This allows the system to adjust the Brillouin amplification applied to each comb tooth. Note that the second $AOM_2$ and fourth $AOM_4$ may be used as intensity modulators to introduce counter-acting frequency shifts of $\Delta v=\pm 55$ MHz to avoid changing the frequency offset between the control pulses and the comb.

With the polarization pulling assisted SBS technique, the comb may be coupled through a polarization controller and then directed through a spool of single mode fiber (e.g., 10 km) using a pair of circulators before reaching a polarizing beamsplitter. The polarization controller may be used minimize transmission through the polarizing beamsplitter in the absence of Brillouin amplification. The control pulses may be coupled into the fiber spool traveling in the opposite direction from the comb. Thus, the Brillouin amplification process serves to rotate the polarization of the comb teeth, leading to transmission of the amplified comb teeth at the polarizing beamsplitter.

Figure 8:
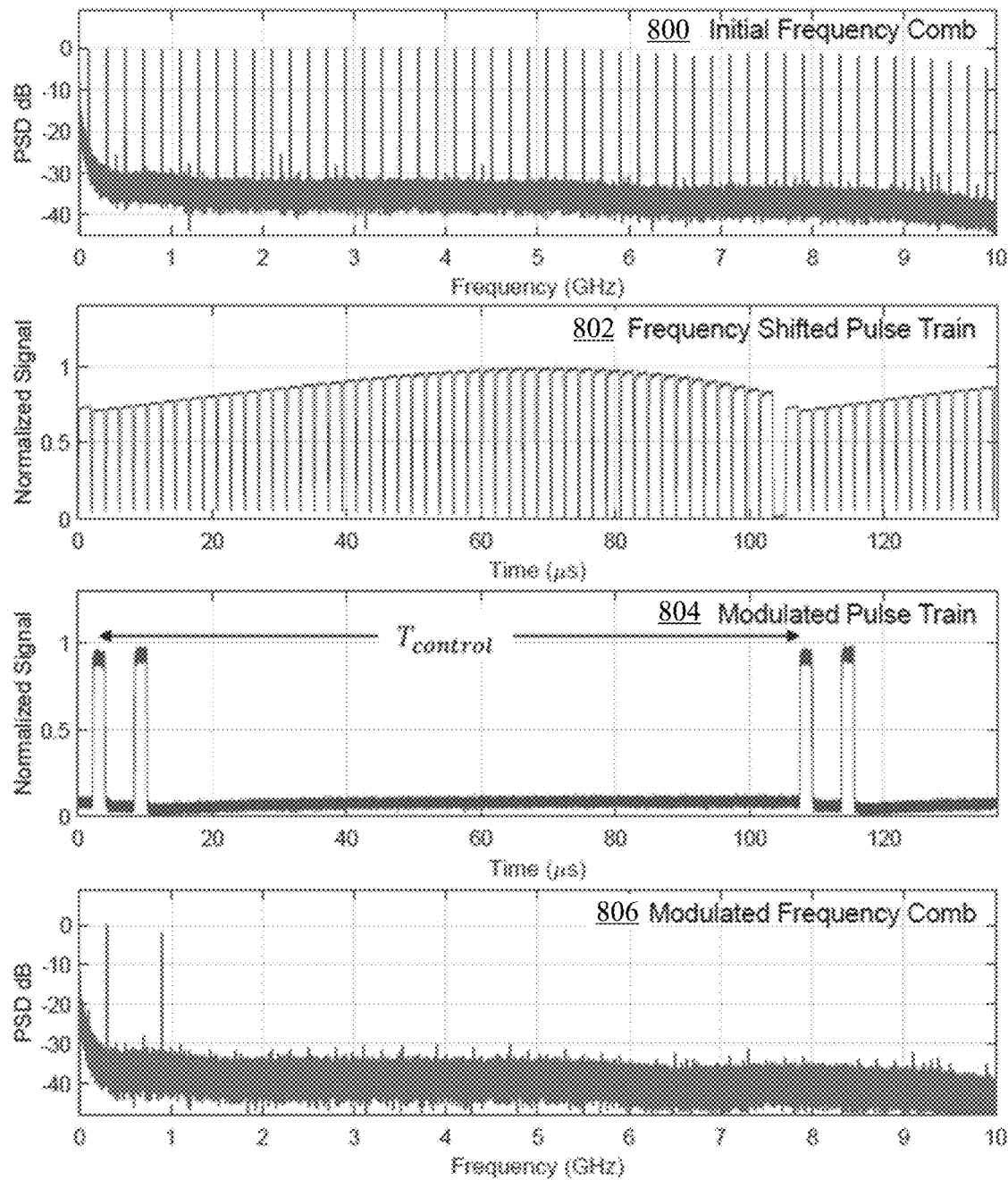
FIG. 8 depicts plots showing the manipulation of an optical frequency comb.

FIG. 8 depicts plots showing the manipulation of an optical frequency comb. In an experiment to demonstrate the operation of the optical frequency comb control technique described herein, system 700 was implemented and the results are shown in FIG. 8.

To characterize the modulated frequency comb, a part of the original laser was diverted to serve as a local oscillator (LO). A fifth $AOM_5$ was used to impart a frequency shift of −100 MHz to the comb in order to offset the intermediate frequencies between the comb teeth and the LO from the intermediate frequencies produced by the comb teeth interfering with each other. The interference signal was detected on a 10 GHz photodetector and recorded on a 25 GHz oscilloscope.

The comb generated by the first frequency loop was first characterized before introducing the control pulses. In this case, polarization controller 736 was adjusted to allow the comb to be transmitted through PBS 740 and recorded the interference pattern produced by the comb and LO. The normalized power spectral density (PSD) of the interference pattern is shown in plot 800 of FIG. 8, revealing a uniform frequency comb with 50 lines spaced by 200 MHz. The slight roll off in comb amplitude near 10 GHz is due to the edge of the tunable bandpass filter used in the first frequency shifting loop.

Then, to demonstrate the operation of the control technique described herein, a frequency shifted pulse train was generated in the second frequency shifting loop as shown in plot 802 of FIG. 8. The pulse train includes 50 pulses. Each pulse is 2 µs in duration and the total pulse train is 103.5 µs. The length of the pulse train was matched to the round-trip time in the ~10 km SMF fiber spool. The slight variation in pulse power could be controlled by fine tuning the EDFA gain. However, $AOM_4$ can also be used to compensate for this variation by adjusting the transmission of each control pulse. In practice, a third $EDFA_3$ coupled to the fourth $AOM_4$ may be used. The third $EDFA_3$ may introduce some distortion in the control pulse amplitude due to gain saturation. To compensate for both effects, it is possible to adjust the transmission through $AOM_4$ to achieve a desired pulse train after the third $EDFA_3$.

Plot 804 of FIG. 8 shows the modulated pulse train after selecting the second and fifth control pulses. After adjusting the polarization controller to minimize transmission of the frequency comb through the PBS, these control pulses were used to select the second and fifth comb teeth. The control pulses were amplified to a peak power of ~100 mW before being coupled into the fiber spool.

Plot 806 of FIG. 8 shows the selected second and fifth comb teeth with a modulation depth of approximately 30 dB. This experiment was repeated by selecting various combinations of comb teeth across the 10 GHz comb bandwidth and this ~30 dB modulation depth was consistently achieved.

In addition to selecting arbitrary combinations of comb teeth, this approach is amenable to tailoring the intensity profile of the entire comb. Shaping the intensity profile of a comb may be valuable for a host of applications, including tunable RF filters or generating Nyquist pulses.

The technique described herein is also capable of generating reconfigurable frequency combs. Each time a new pulse train is generated by the second frequency shifting loop, as described above in reference to FIG. 7, the modulation pattern may be adjusted by $AOM_4$. This ability to quickly reshape the frequency comb is crucial for a number of applications in RF photonics, including dynamic RF generation and reconfigurable RF filtering. Note that variations in the selected comb teeth amplitude may be due to gain saturation at the third $EDFA_3$, and may be compensated for by adjusting the power of the control pulses injected into that amplifier.

Depending on the application, the systems described herein may be adjusted to manipulate frequency combs with more teeth or to update the modulation pattern more frequently. The technique described herein may also be used to modulate frequency combs generated using other approaches, such as an electro-optic frequency comb or a mode-locked laser. While this technique is quite flexible, there may be trade-offs between modulation depth, update speed, and the number of comb teeth which are controlled. One of the main drivers for these trade-offs is the Brillouin amplification process, since the modulation depth is dictated by the Brillouin gain and the polarizing beamsplitter extinction. The Brillouin gain is proportional to the product of the pump power and the duration of the pump pulse. The peak pump power may be kept below ~200 mW to avoid the onset of modulation instability, but increasing the gain requires longer pulses. The update rate is set by the length of the pulse train, so achieving a faster update rate may require shorter pulses, which may reduce the Brillouin gain or limit the system to manipulating fewer comb teeth. In addition, if the pulse duration approaches the phonon lifetime (~10 ns), the gain spectrum may be broadened and the gain may be significantly reduced. To some degree, this trade-off may be mitigated by using highly non-linear fiber that enables higher Brillouin gain at the same pump power (e.g., by reducing the mode field diameter). Note that the length of the interaction fiber is set by the length of the pulse train as $L_{fiber}=T_{control}\cdot(c/2n)$ where c is the speed of light and n is the refractive index of the fiber. This ensures that each comb tooth always interacts with its corresponding control pulse once while passing through the interaction fiber. This is needed to avoid introducing amplitude modulation at the pulse train period. If the pulse train requires very long fiber, optical attenuation could be a concern.

In the above experiment, the total comb bandwidth of 10 GHz was slightly less than the Brillouin frequency of ~10.8 GHz. If the comb bandwidth exceeds the Brillouin frequency, care should be taken to ensure that none of the comb teeth overlap with the anti-Stokes resonances produced by the control pulses. This could be accomplished by adjusting the comb spacing or adjusting the Brillouin frequency by selecting a different fiber type.

The Brillouin amplification process may introduce noise. In the example embodiment that leverages the polarization pulling effect to increase the modulation depth, position dependent polarization fading may also introduce a temporal modulation to the selected comb teeth. This may be avoided by using polarization maintaining fiber. While polarization maintaining fiber may preclude the use of polarization pulling, the anti-Stokes interaction may be combined with the Stokes interaction to maintain a high modulation depth by attenuating some teeth while amplifying others. This may require two trains of control pulses—one in which the control pulses are shifted by $-f_{SBS}$ relative to the comb and one in which the control pulses are shifted by $+f_{SBS}$. The lower frequency control pulses may then be selected to attenuate some comb teeth while the higher frequency control pulses may be used to amplify others.

CONCLUSION

While various embodiments of the disclosed subject matter have been described above, it should be understood that they have been presented by way of example only, and not limitation. Various modifications and variations are possible without departing from the spirit and scope of the described embodiments. Accordingly, the breadth and scope of the disclosed subject matter should not be limited by any of the above-described exemplary embodiments.

What is claimed is:

1. A method for optical frequency comb control, comprising:
generating a train of control pulses, each of the control pulses being frequency-locked to a corresponding tooth of an optical frequency comb to be controlled, the frequency comb having a plurality of comb teeth that are separated from one another by a comb frequency spacing; and
individually modulating each comb tooth of the plurality of comb teeth via stimulated Brillouin scattering (SBS) using the train of control pulses.

2. The method of claim 1, wherein the providing tooth-level control comprises:
amplifying one or more teeth of the frequency comb via a Brillouin Stokes process.

3. The method of claim 1, wherein the providing tooth-level control comprises:
attenuating one or more teeth of the frequency comb via a Brillouin anti-Stokes process.

4. The method of claim 1, wherein the providing tooth-level control comprises:
phase shifting one or more teeth of the frequency comb.

5. The method of claim 1, wherein the providing tooth-level control comprises:
rotating a polarization of one or more teeth of the frequency comb to leverage a polarization pulling effect configured to improve extinction, thereby increasing modulation depth.

6. The method of claim 1, wherein the generating the train of control pulses comprises:
generating an initial control pulse;
shifting a frequency of the initial control pulse by a predetermined frequency to generate a first control pulse after the initial control pulse is coupled into a recirculating fiber loop;
amplifying the first control pulse to compensate for loss;
repeating the shifting and amplifying steps to generate the train of control pulses, the control pulses being separated from one another by the predetermined frequency that is equal to the comb frequency spacing.

7. The method of claim 6, wherein the generating the train of control pulses further comprises:
fine tuning an amplitude and/or frequency of each control pulse of the train of control pulses to create a pattern that is configured to be imparted onto the frequency comb.

8. The method of claim 1, wherein providing tooth-level control of the optical frequency comb comprises:
coupling the train of control pulses into an SBS gain medium such that the train of control pulses propagates in a direction that is opposite of a direction of the frequency comb to allow one or more comb teeth of the frequency comb to be selectively controlled.

9. The method of claim 8, wherein the train of control pulses is configured to have an overall frequency offset that matches a SBS frequency of the gain medium, thereby ensuring that a particular control pulse is shifted by a Brillouin frequency away from a particular comb tooth that the particular control pulse is designed to control.

10. The method of claim 8, wherein the train of control pulses is configured to have a total period that is based on a time of flight of the gain medium to ensure the frequency comb interacts with at least one control pulse.

11. The method of claim 1, wherein generating the train of control comprises:
creating a first pulse train that comprises a predetermined number of control pulses (N) in a first stage, the control pulses being separated from one another by a predetermined frequency ($\Delta f$); and
replicating the first pulse train to create a series of pulse trains separated by the predetermined number of control pulses and the predetermined frequency (N$\Delta f$) in a second stage.

12. The method of claim 1, wherein generating the train of control pulses comprises:
creating a first pulse train that comprises a predetermined number of control pulses (N);
creating a second pulse train based on the first pulse train and coupling the second pulse train to a recirculating fiber loop while blocking the first pulse train as it recirculates with the fiber loop; and
changing a frequency at which a frequency shifting element shifts to the predetermined number of control pulses and the predetermined frequency (N$\Delta f$).

13. The method of claim 1, wherein generating the train of control pulses comprising:
generating a plurality of pulse trains in parallel using a plurality of recirculating fiber loops; and
combining the plurality of pulse trains to generate the train of control pulses.

14. A system for optical frequency comb control, comprising:
a seed laser configured to generate an initial control pulse of a train of control pulses, each of the control pulses being frequency-locked to a corresponding tooth of an optical frequency comb to be controlled, the frequency comb having a plurality of comb teeth that are separated from one another by a comb frequency spacing;
a stimulated Brillouin scattering (SBS) gain medium configured to enable tooth-level control of the frequency comb via SBS using the train of control pulses;
a recirculating fiber loop configured to generate the train of control pulses, the fiber loop comprising
a frequency shifting element configured to shift a frequency of the initial control pulse by a predetermined frequency to generate a first control pulse after the initial control pulse is coupled into the fiber loop; and
an amplifier configured to amplify the first control pulse to compensate for loss,
wherein the control pulses are separated from one another by the predetermined frequency that is equal to the comb frequency spacing.

15. The system of claim 14, wherein tooth-level control comprises at least one amplifying, attenuating, phase shifting one or more teeth of the frequency comb, or rotating a polarization of one or more teeth of the frequency comb.

16. The system of claim 14, further comprising:
a modulator configured to modulate at least one of amplitude or frequency of each control pulse of the train of control pulses to create a pattern that is configured to be imparted onto the frequency comb.

17. The system of claim 14, wherein the train of control pulses is coupled into the SBS gain medium such that the train of control pulses propagates in a direction that is opposite of a direction of the frequency comb to allow one or more comb teeth of the frequency comb to be selectively controlled.

18. The system of claim 14, wherein the train of control pulses is configured to have an overall frequency offset that matches a SBS frequency of the gain medium, thereby ensuring that a particular control pulse is shifted by a Brillouin frequency away from a particular comb tooth that the particular control pulse is designed to manipulate.

19. The system of claim 14, wherein the train of control pulses is configured to have a total period that is based on a time of flight of the gain medium to ensure the frequency comb interacts with at least one control pulse.

20. A method for optical frequency comb control, comprising:
generating a train of control pulses, each of the control pulses being frequency-locked to a corresponding tooth of an optical frequency comb to be controlled, the frequency comb having a plurality of comb teeth that are separated from one another by a comb frequency spacing; and
enabling tooth-level control of the frequency comb via stimulated Brillouin scattering (SBS) using the train of control pulses,
wherein providing tooth-level control of the optical frequency comb comprises:
coupling the train of control pulses into an SBS gain medium such that the train of control pulses propagates in a direction that is opposite of a direction of the frequency comb to allow one or more comb teeth of the frequency comb to be selectively and independently controlled.

\* \* \* \* \*